STEPHEN J. WENTHE
NORMAN N. LAREAU
INVENTORS

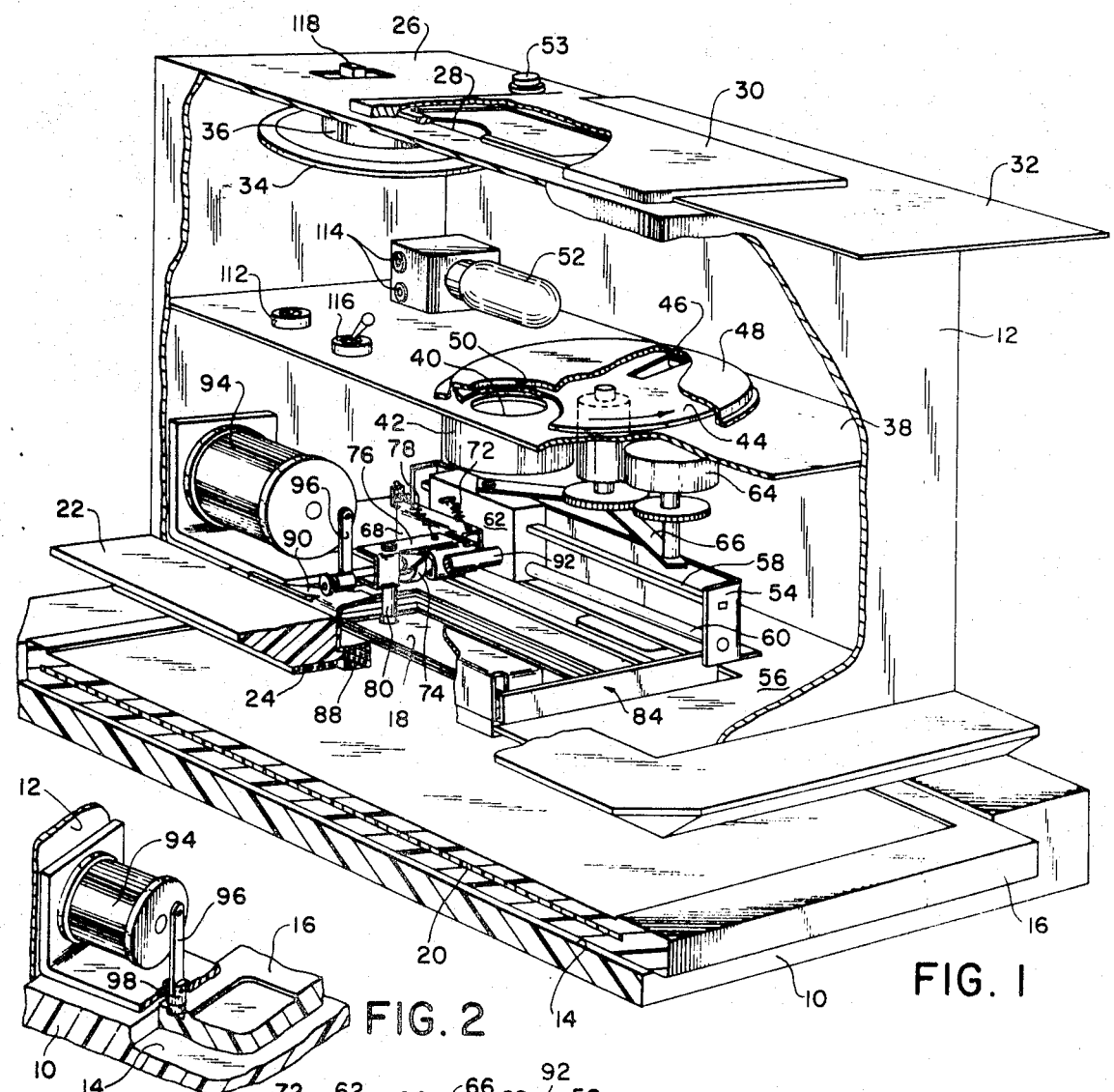
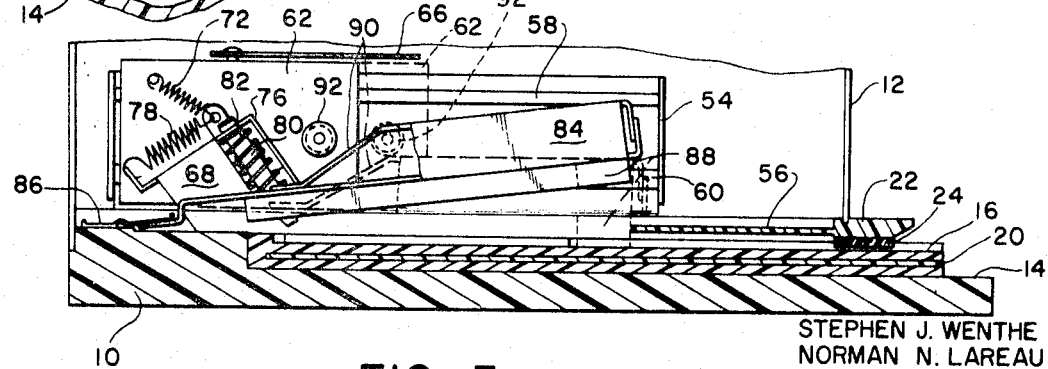

STEPHEN J. WENTHE
NORMAN N. LAREAU
INVENTORS

BY Robert W Hampton
Milton S. Sales
ATTORNEYS

STEPHEN J. WENTHE
NORMAN N. LAREAU
INVENTORS

United States Patent Office 3,614,917
Patented Oct. 26, 1971

3,614,917
APPARATUS AND METHOD FOR FORMING A DEVELOPABLE PATTERN ON LIGHT-SENSITIVE FILM CARRIED IN A CASSETTE
Stephen J. Wenthe and Norman N. Lareau, Rochester, N.Y., assignors to Eastman Kodak Company, Rochester, N.Y.
Filed May 2, 1969, Ser. No. 821,194
Int. Cl. G03b 17/24
U.S. Cl. 95—1.1
6 Claims

ABSTRACT OF THE DISCLOSURE

Apparatus for forming a developable pattern on a light-sensitive film carried in a cassette having an openable window, the marking apparatus including a mechanism for holding the cassette in a predetermined position, a device for opening the window, a support for prepared data and means for optically projecting an image of the data through the window onto the film in the cassette. The apparatus may also be provided with electrical switch means for preventing its operation if the cassette is not properly received therein.

CROSS-REFERENCE TO RELATED APPLICATION

Reference is made to commonly assigned copending U.S. patent application Ser. No. 625,829, now Pat. No. 3,504,180, entitled X-Ray Cassette filed Mar. 24, 1967 in the name of Frederick F. Tone.

BACKGROUND OF THE INVENTION

Filed of the invention

The present invention relates to an apparatus for forming latent-making patterns on film such as on X-ray film, and more particularly, for making such film by exposure of the film to a light image of identification data.

Description of the prior art

In the field of radiography, where an X-ray of a patient may be taken and later processed with a group of similar X-rays, there is a need for marking each film sheet with identifying data to prevent loss or substitution of one patient's records for another's. One such photographic identification apparatus and method is described in British Pat. No. 1,006,295. Apparatus according to that patent comprises an automatic cassettee unloader which incorporates mechanism for opening cassettes containing exposed X-ray films and conveying the films from the cassettes for processing, and which also incorporates means for holding in a predetermined position identification data, means for optically projecting such data locally onto the film while in the apparatus, and means which automatically time such projection to coincide with the attainment of a predetermined stage in the cycle operation whereby a cassette is opened and its film is conveyed so that the data is projected onto the film at a predetermined local position either while the film is in the opened cassettee or while it is being conveyed therefrom. While this apparatus is a considerable improvement over previous methods such as the use of lead or other X-ray absorbing identification means or marks, or by writing directly on the film sheet, the manner of performing the improved method disclosed in the British patent involves certain disadvantages. In particular, the projection operation is not conducted until the cassette is opened for film removal and processing. Thus, there is a possibility that the identification data will be lost or misplaced during the period in which the loaded cassette is being stored or transported to a central processing lab. Further, if the identification process is timed to correspond to removal of a film sheet from the cassette, complicated and expensive timing circuits must be provided to insure proper location of the identification markings on the film sheet.

SUMMARY OF THE INVENTION

It is an object of the present invention to provide apparatus for forming a latent image of a marking pattern on light-sensitive film which is contained in a closed cassette having a window with an openable cover by means of optically projecting identification on an image of such pattern onto the film through the window.

It is another object of the present invention to provide apparatus of the above type which has means for properly locating the cassette relative to the identification data and for automatically opening a window in the cassette through which the image is optically projected onto the film.

According to a preferred embodiment of the present invention, a light-tight housing is provided having a clamping device for holding a cassette and a receptacle for receiving a card containing patient identification data. The housing is provided with a mechanism for opening a window in the cassette and with optical means for projecting an image of the data on the card through the window to the film cassette.

The invention, and its objects and advantages, will become more apparent in the detailed description of the preferred embodiments presented below.

BRIEF DESCRIPTION OF THE DRAWING

In the detailed description of the preferred embodiments of the invention presented below, reference is made to the accompanying drawing, in which:

FIG. 1 is a perspective view, partially in section, of the identification camera of the present invention;
FIG. 2 is a perspective view, partially in section, of a mechanism for locking the cassette in the camera;
FIG. 3 is a fragmental, sectional view of the light-sealing mechanism shown in FIG. 1.

DESCRIPTION OF THE PREFERRED EMBODIMENTS

Figure 4:
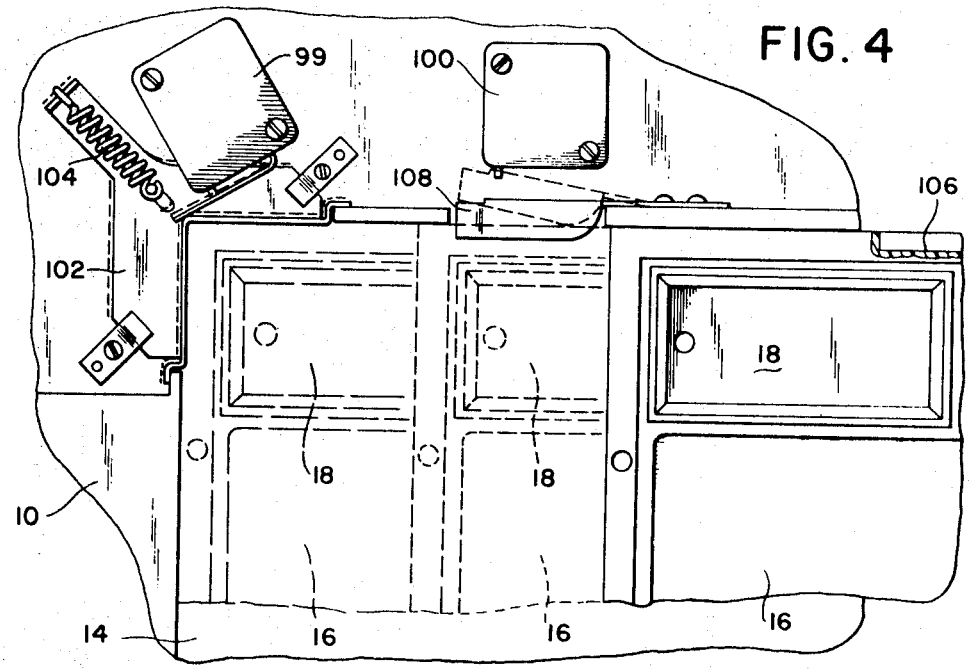
FIG. 4 is a top plan view of the switching arrangement of the camera shown in FIG. 1.

The embodiment represented in FIG. 1 comprises a base 10 and a casing or housing 12 mounted thereon. Base 10 has a recess 14 having open front and right sides as viewed in that figure. The recess is adapted to receive a film cassette 16 having a window with a slidable cover 18 through which identification data is to be projected onto a sheet of film 20 carried by the cassette. The cassette is of a known type and is fully described in U.S. patent application Ser. No. 625,829 entitled X-Ray Cassette, filed Mar. 24, 1967 in the name of Frederick F. Tone.

Casing 12 is provided with a ridge 22 which has a light seal 24 adapted to form a light barrier with the top of cassette 16.

The top wall 26 of casing 12 is provided with an aperture 28 covered by a plate 30 for receiving a card or sheet 32. Card 32 may contain identification data in the area overlying aperture 28, such data being intended to be projected onto film 20 in the area of window 18. The data on card 32 may relate to any matter such as information for identifying a patient if film 20 has been exposed with X-rays during a physical examination.

A clock wheel 34 is mounted below aperture 28 and has appropriate graduations on the lower side, not shown, for indicating on film 20 the time of exposure of the identification data. The clock is driven by an electric motor 36.

Casing 12 is divided by a partition 38 having an aperture 40 therethrough. A lens system 42, which is better seen in FIG. 5, underlies aperture 40, and a rotary shutter disc 44 is positioned above aperture 40 and is provided with a shutter aperture 46. Shutter disc 44 is protected by a cover 48 having an opening 50 aligned with aperture 40.

A lamp 52 is mounted above partition 38 to illuminate card 32 through aperture 28. Lamp 52 is controlled by a circuit operated by insertion of cassette 16 in recess 14 in a manner to be described hereinafter. A colored, translucent button 53 is provided in top wall 26 to give a visual indication when lamp 52 is lighted.

Figure 5:
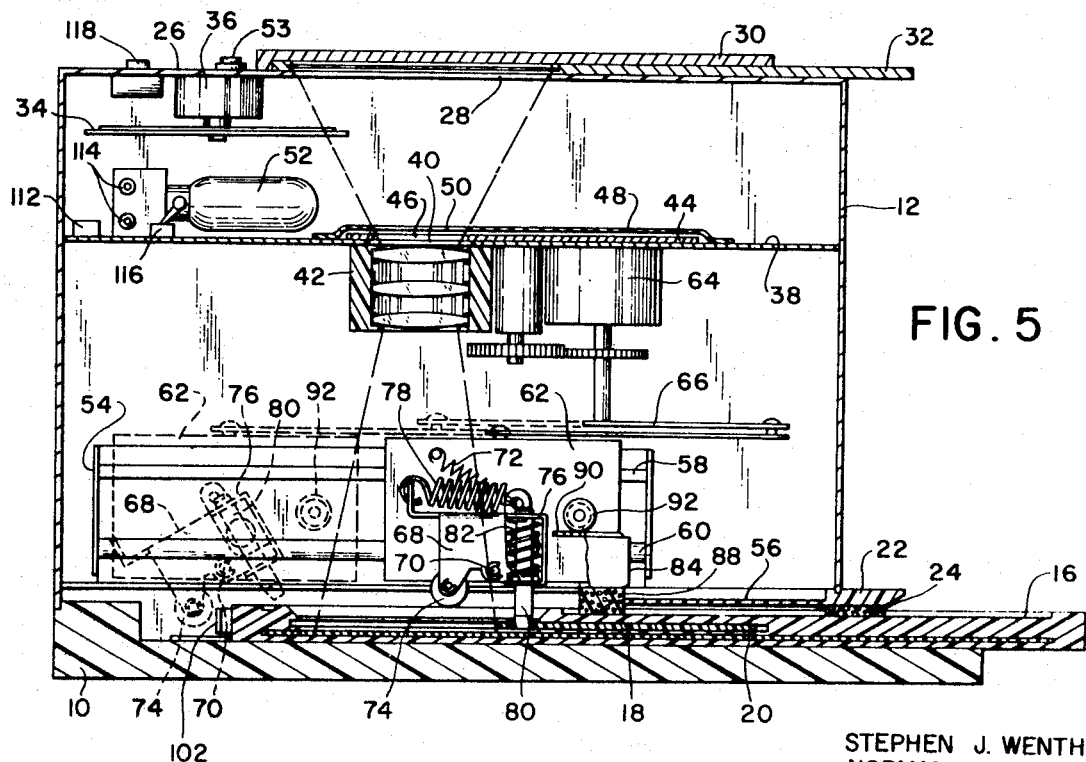
FIG. 5 is a front sectional view of the camera of FIG. 1 showing the operation of the window opening mechanism.

Referring to FIGS. 1 and 5, the mechanism for opening window slide 18 of cassette 16 will be described. A bracket 54 is mounted on a lower wall 56 of casing 12. A bracket carries a pair of rods 58 and 60 upon which a carriage 62 is mounted for reciprocal motion.

Carriage 62 is driven by a one way electric motor 64 through a crank arm mechanism 66. A support 68 is pivotally mounted to carriage 66 at 70. Support member 68 is urged in a counterclockwise direction by a coil spring 72 and carries a roller 74 adapted to ride up on the upper surface of cassette 16 to pivot support member 68 from its position shown in phantom lines in FIG. 5 to its full line position in FIGS. 1 and 5.

A U-shaped member 76 is pivotally mounted on support member 68 for rotation in a clockwise direction relative thereto from the position shown. U-shaped member 76 is held in its shown position by a coil spring 78. A pin 80 depends from U-shaped member 76 and is slidably mounted therein. A coil spring 82 resiliently urges pin 80 downwardly.

Light seal 24 on ridge 22 may in some instances not form a complete seal with the upper surface of cassette 16 due, for instance, to warpage of the cassette. Therefore, we have provided an auxiliary light seal which is best seen with reference to FIG. 3. The auxiliary light seal is formed of an L-shaped, rigid member 84 which is pivotally mounted on base 10 by a spring hinge 86. L-shaped member 84 carries a pad of light-sealing material 88 which fits into an opening in lower wall 56 of casing 12. The upper portion of L-shaped member 84 forms a ramp or cam surface 90 which cooperates with a roller rod 92 extending from carriage 62. As the carriage is moved to the right by crank arm mechanism 66, rod 92 rides along cam surface 90 to lower L-shaped member 84 and pad 88 to seal light from window 18.

To prevent movement of cassette 16 as window 18 is being opened, a lock, shown in FIG. 2, may be provided. The lock includes a rotary solenoid 94 which pivotally carries an arm 96 having a pin 98 pivotally attached to the free end. When the cassette is placed in the base, an electrical switch, to be later described, actuates solenoid 94 to lower pin 98 into a hole in cassette 16 locking the cassette against movement.

The switching operation referred to above will now be described with reference to FIG. 4. A pair of switches 99 and 100 are arranged adjacent recess 14 in base 10. Switch 99 is controlled by a Y-shaped slide 102 which is urged towards recess 14 by a spring 104. Switch 99 normally is opened and is closed when the corner of cassette 16 forces slide 102 in a leftwardly and upwardly direction. The switching mechanism is arranged so that the switch will not close when slide 102 is moved only in an upwardly or leftwardly direction. Switch 100 is provided to insure that the correct corner of the cassette is placed in the apparatus. The cassette is formed with a notch 106 in one side. Switch 100 is of the normally closed type and will remain open unless a shoe 108 is aligned with notch 106 in the cassette. Motor 64, lamp 52 and solenoid 94 are controlled by switches 99 and 100 so that both switches must be closed before the apparatus will operate.

OPERATION

The description of the operation of the apparatus will begin with reference to FIG. 4. In that figure, a cassette 16 is shown in full line to the right of shoe 108 preparatory to being inserted into the apparatus. As cassette 16 is slid leftwardly to its mid position shown in phantom lines, shoe 108 is cammed towards switch 100 opening the circuit through that switch. Further movement of cassette 16 to the left moves Y-shaped slide 102 upwardly and leftwardly to close switch 99. At the same time, shoe 108 falls into recess 106 of cassette 16 to reclose switch 100, starting the exposure cycle. Current flowing through switches 99 and 100 actuate solenoid 94 to lower locking pin 98 into its matching hole in cassette 16. Of course, solenoid 94 could be omitted if it were determined that shoe 108 was sufficient for a given operation to retain the cassette against movement.

Lamp 52 is now turned on to illuminate data card 32, and motor 64 is actuated to draw carriage 62 rightwardly. As carriage 62 is moved, rod 92 rides along cam surface 90 of L-shaped member 84 to lower light seal 88 onto the upper surface of cassette 16. Simultaneously, roller 74 rides up onto the top surface of cassette 16 to pivot support member 68 about pivot 70, bringing pin 80 downwardly into the hole in window slide 18. Further movement of slide 62 draws pin 80 to the right to open window slide 18.

As window slide 18 is being opened, motor 64 is turning shutter 44 to align shutter aperture 46 with aperture 40 in partition 38 as the crank arm turns by the 180° position. Aperture 46 is properly sized to expose the film underlying window 18 with the data from card 32 through lens system 42. The aperture size and the speed of motor 64 may be set to provide an exposure time of 1/30 of a second. As motor 64 is completing one revolution, the window slide is closed, pin 80 is withdrawn, light seal 88 is raised and pin 98 is raised by de-energizing solenoid 94. A cassette is then ready to be withdrawn.

In the event that a defective cassette is loaded into the apparatus, the mechanism may jam, thereby overloading motor 64. Therefore, we have provided a safety device to prevent jamming. In the event that pin 80 does not locate in the hole in window slide 18, the pin will raise relative to U-shaped member 76 against the force of spring 82. The entire operation will then proceed as described above, but window slide 18 will not be opened. In the event that pin 80 does locate in the hole in window slide 18 but the window jams and will not open, movement of carriage 62 to the right will proceed and U-shaped member 76 will pivot relative thereto, thereby allowing pin 80 to withdraw from the hole and move along the top surface of the window slide. Once again, the procedure described above will continue without opening the window slide.

VOLTAGE CONTROL SYSTEM

The apparatus described herein is intended for use with house wiring. It is well-known that the voltage supply of such wiring varies from location to location and would, therefore, produce varying intensities of illumination from lamp 52. Therefore, the circuit to lamp 52 includes a voltage regulator 112 which may be in the form of a rheostat. A pair of terminals 114 are connected over lamp 52 to which a voltmeter may be connected. When the apparatus is placed in operation, a voltmeter is connected to terminals 114 and the voltage across lamp 52 is adjusted by manually turning voltage regulator 112. To prevent operation of motor 64 while the voltage is being read, we have provided a switch 116 which is used to connect lamp 52 directly to the voltage source and to disconnect motor 64 while the voltage is being read.

In order to provide for the marking of films having different sensitivities, we have provided a three position switch 118 in top wall 26. The voltage supplied to lamp 52 is controlled by switch 118 so that the intensity of the lamp can be made to correspond to the sensitivity of the film in cassette 16.

SECOND EMBODIMENT

Figure 6:
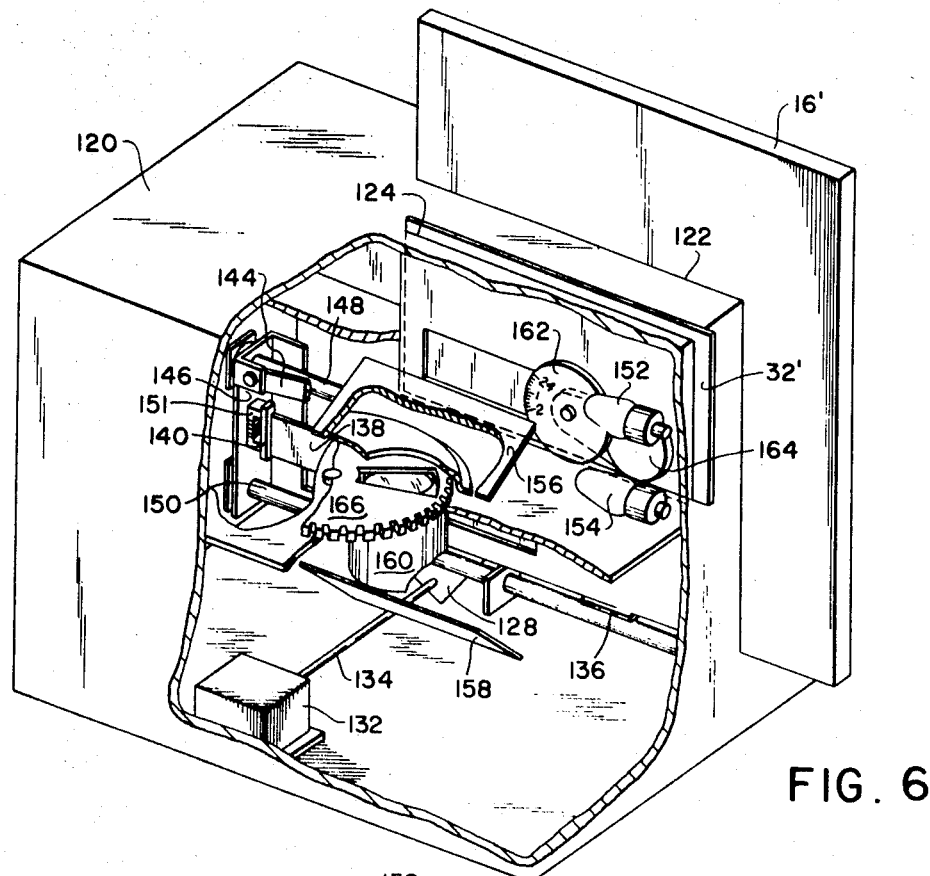
FIG. 6 is a perspective view, partially in section, of another embodiment of the camera shown in FIG. 1.
Figure 7:
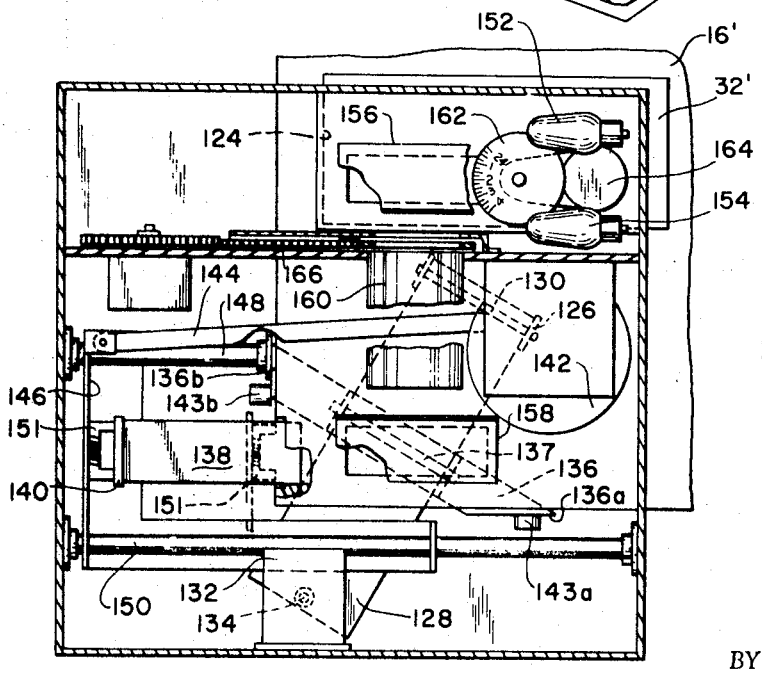
FIG. 7 is a front sectional view of the camera shown in FIG. 6.
Figure 8:
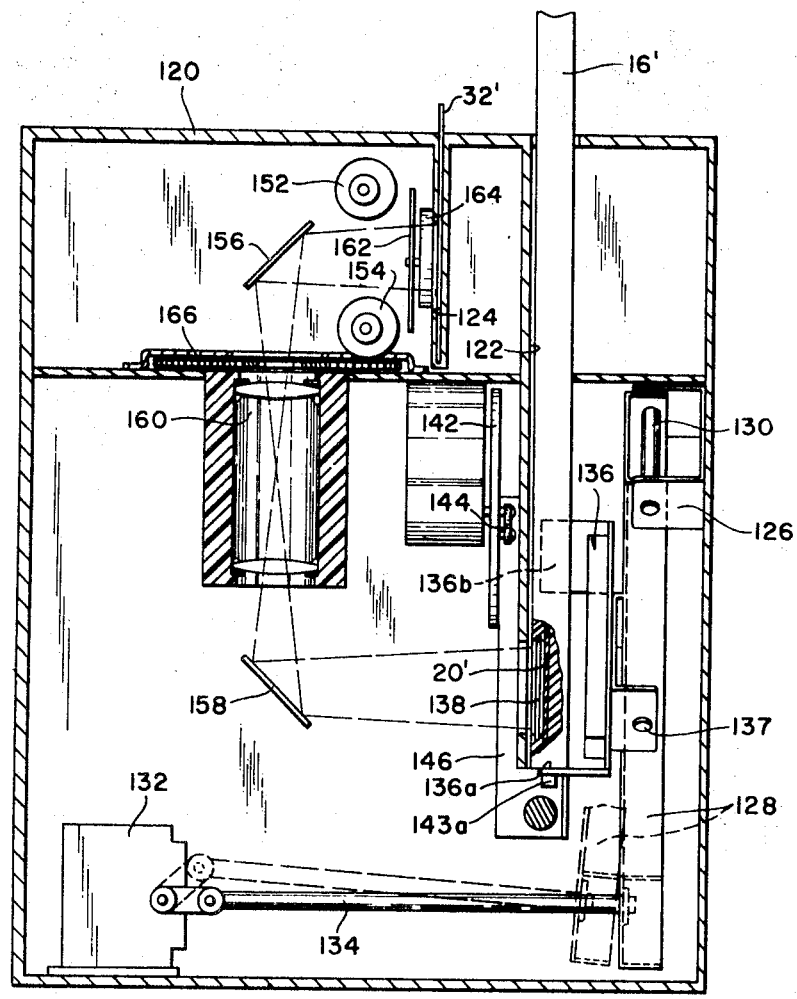
FIG. 8 is a side sectional view of the camera shown in FIG. 6.

FIGS. 6–8 show another embodiment of the invention in which a casing 120 has a first slot 122 into which a cassette 16' can be inserted. A second slot 124 is provided into which a data card 32' may be inserted.

FIGS. 7 and 8 show a mechanism for clamping cassette 16' in slot 122. The clamping mechanism comprises a bracket 126 mounted on a wall of casing 120 and a bar 128 pivotally mounted to bracket 126 at 130. The end of bar 128 is connected to a solenoid 132 by a crank arm mechanism 134 so that when the solenoid is actuated, clamping bar 128 is pivoted towards cassette 16'. A pressure pad 136 is pivotally connected to bar 128 at 137 and rigidly clamps cassette 16' in slot 122. Pressure pad 136 has a pair of projections 136a and 136b which define the position of cassette 16'.

The cassette shown in FIGS. 6–8 is not of the same type as shown in FIGS. 1–5 in that it has a window slide 138 which is removed by drawing it to the left as shown in FIGS. 6 and 7. The window slide has a tab 140 which is constructed of magnetic material.

The mechanism for opening this type of window slide comprises a rotary electric motor 142 controlled by switches 143a and 143b on projections 136a and 136b, respectively, to which a crank arm 144 is connected. The other end of crank arm 144 is connected to a carriage 146 which slides on a pair of rods 148 and 150 mounted in casing 120. Carriage 146 carries an electromagnet 151 which, when energized by switches 143a and 143b, attracts tab 140 of window slide 138 and pulls it to the left when motor 142 is energized, thereby opening window slide 138.

The optical system for projecting data from card 32' to the film in cassettee 16' includes a pair of lamps 152 and 154, a pair of mirrors 156 and 158 and a lens system 160. A clock wheel 162 is driven by an electric motor 164 and projects into the optical shield. A shutter mechanism 166 similar to that shown in the embodiment of FIGS. 1–5 is provided over lens system 160.

OPERATION

When cassette 16' is inserted into slot 122, switches 136a and 136b actuate solenoid 132 to clamp cassette 16' by bar 128. Lamps 152 and 154 are lighted, and motor 142 is energized to withdraw window slide 134. Shutter mechanism 166 is opened monmentarily to expose the film in cassette 16' with identification data from card 32'. Continued rotation of motor 143 returns window slide 138 to its position within cassette 16' whereupon solenoid 132 is de-activated to release casette 16'.

Portions of the apparatus in the embodiment shown in FIGS. 6–8 have been omitted for clearity. This omitted structure may take the form herein described with reference to the embodiment illustrated in FIGS. 1–5.

The invention has been described in detail with particular reference to preferred embodiments thereof, but it will be understood that variations and modifications can be effected within the spirit and scope of the invention.

We claim:
1. Apparatus for forming a developable marking pattern on a light-sensitive film carried in a cassette having a window with an openable cover, said apparatus comprising:
   (a) a support for receiving cassettes containing such film, said support including means for forming a light-tight enclosure about the window of a received cassette;
   (b) means for receiving optically projectable data corresponding to said desired pattern;
   (c) means within said enclosure for opening the cover in a received cassette; and
   (d) means for optically projecting an image of said data through the window onto the film in the received cassette to form a latent developable image corresponding to said desired pattern.

2. Apparatus for forming a developable marking pattern on a light-sensitive film carried in a cassette having a window with an openable cover said apparatus comprising:
   (a) a support for receiving cassettes containing such film;
   (b) means for receiving optically projectable data corresponding to said desired pattern;
   (c) means for opening the cover in a received cassette, said cover opening means including (1) an electric motor and (2) a carriage drivingly connected to said motor and connectable to said cover, whereby energization of said motor moves said carriage through a path to open said cover; and
   (d) means for optically projecting an image of said data through the window onto the film in a received cassette to form a latent developable image corresponding to said desired pattern.

3. Apparatus as defined in claim 2 wherein said motor is of the rotary type and the connection between said carriage and said motor comprises a crank arm mechanism to convert rotary motion of said motor to linear motion of said carriage.

4. Apparatus as defined in claim 1 wherein said support for receiving cassettes includes means for clamping the cassette in said support.

5. Apparatus as defined in claim 1 wherein said means for optically projecting said data includes:
   (a) a light source for illuminating said data; and
   (b) an optical system for focusing light reflected from said data onto the film through said window.

6. Apparatus as defined in claim 1 further comprising:
   a shutter positioned between said data receiving means and said support; and
   means for opening said shutter for a predetermined period of time when the cover in a received cassette is opened.

References Cited

UNITED STATES PATENTS

| | | | |
|---|---|---|---|
| 1,402,228 | 1/1922 | Greer et al. | 355—40 X |
| 2,146,920 | 2/1939 | Strem | 95—1.1 |
| 2,420,726 | 5/1947 | Sabin | 95—1.1 |

JOHN M. HORAN, Primary Examiner

U.S. Cl. X.R.

355—40